March 26, 1935. J. S. PECKER 1,995,460
AIRCRAFT ROTATIVE WING MOUNTING
Filed Oct. 7, 1931 4 Sheets-Sheet 1
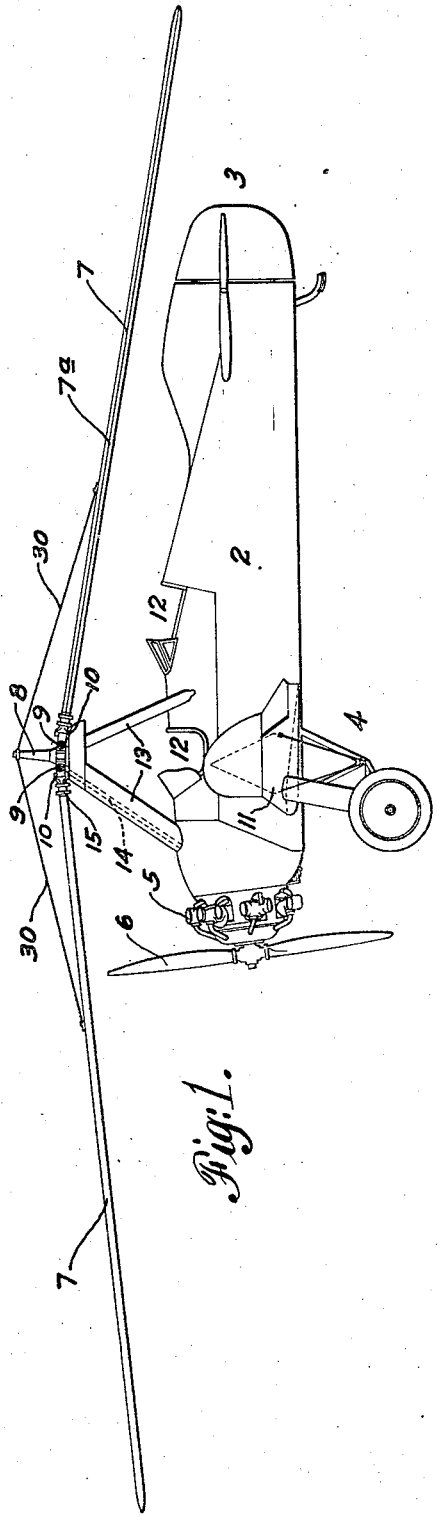
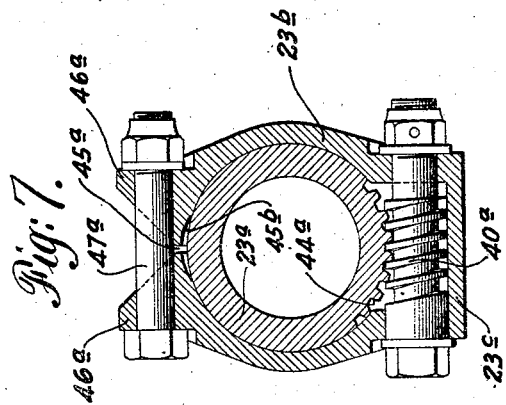
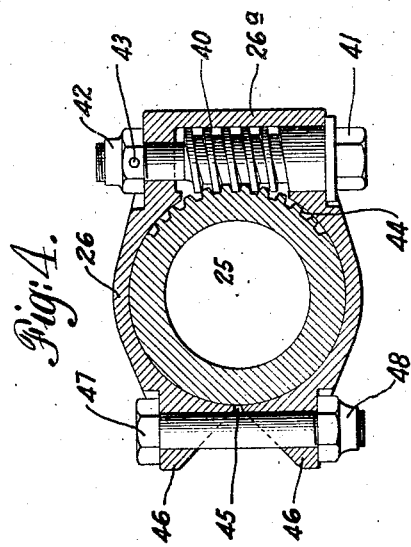
INVENTOR
Joseph S. Pecker
BY
ATTORNEYS March 26, 1935. J. S. PECKER 1,995,460
AIRCRAFT ROTATIVE WING MOUNTING
Filed Oct. 7, 1931 4 Sheets-Sheet 2
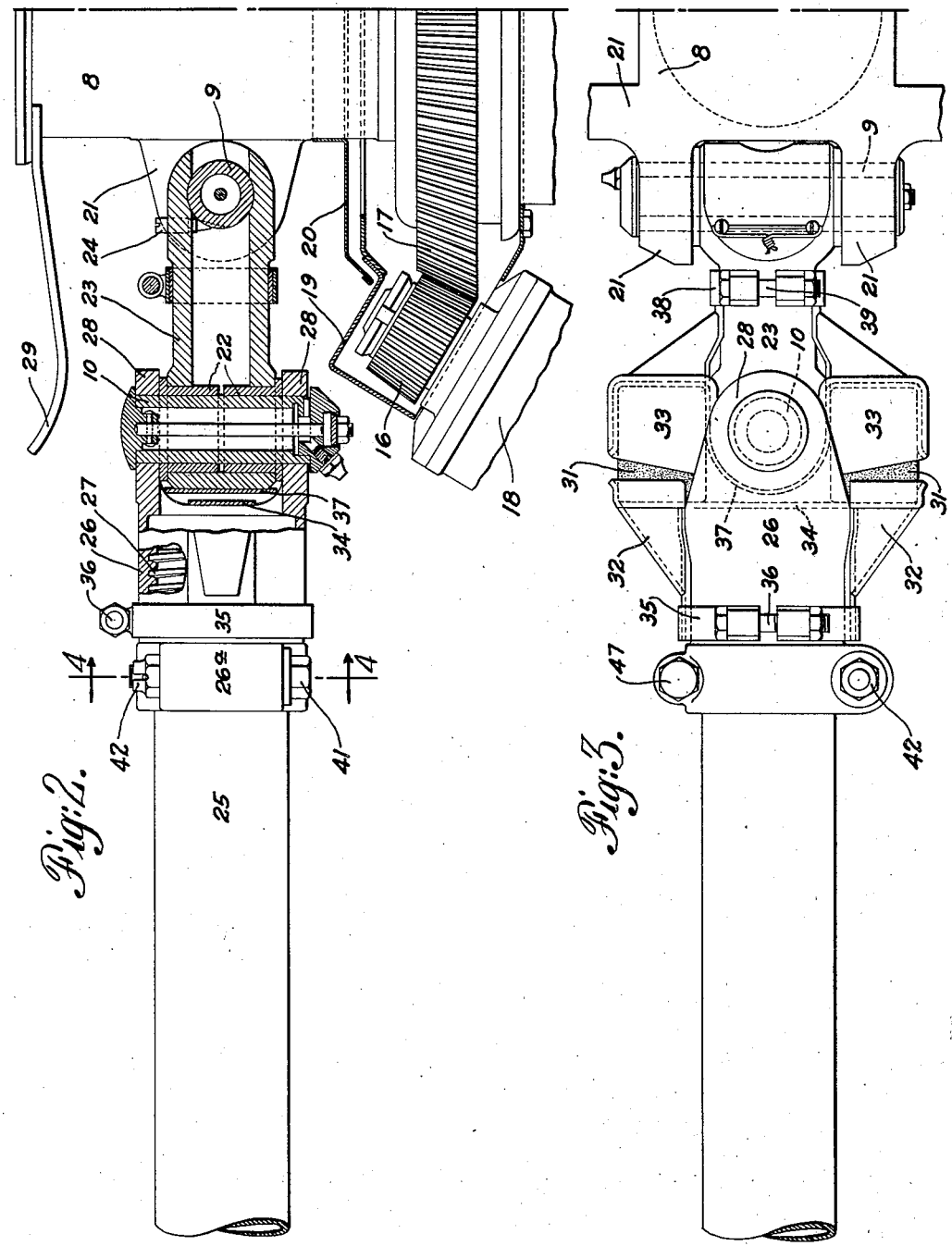

March 26, 1935. J. S. PECKER 1,995,460
AIRCRAFT ROTATIVE WING MOUNTING
Filed Oct. 7, 1931 4 Sheets-Sheet 3
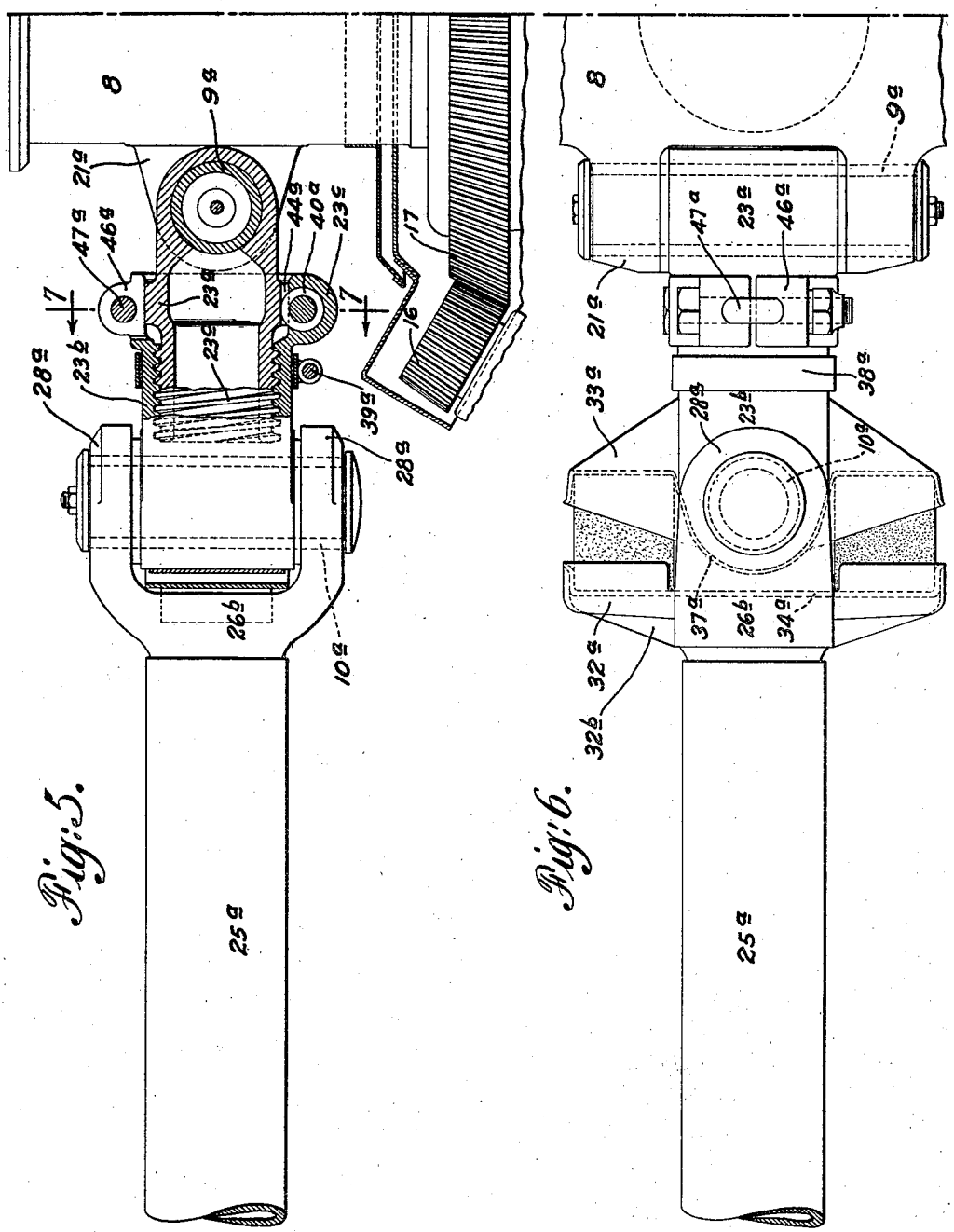
INVENTOR
Joseph S. Pecker
BY
ATTORNEYS March 26, 1935.  J. S. PECKER  1,995,460
AIRCRAFT ROTATIVE WING MOUNTING
Filed Oct. 7, 1931  4 Sheets-Sheet 4
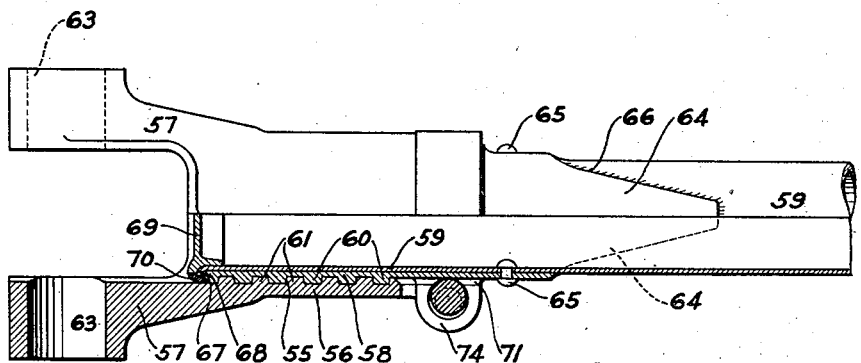
Fig. 9.
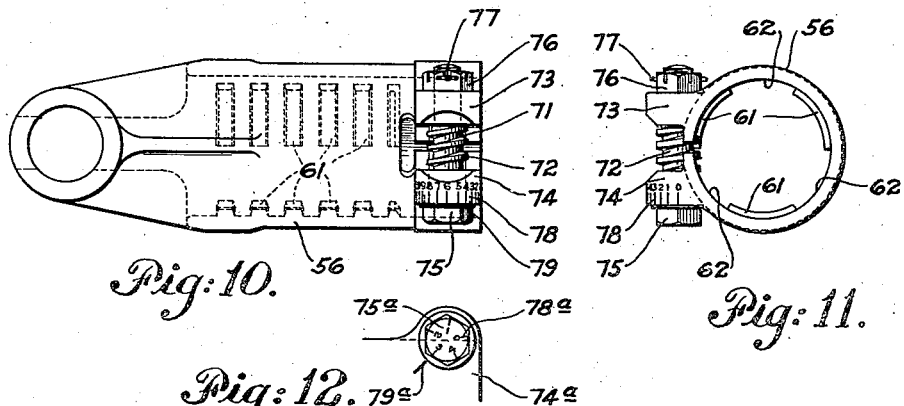
Fig. 10.  Fig. 11.
Fig. 12.
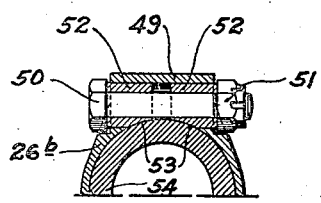
Fig. 8.
INVENTOR.
Joseph S. Pecker
BY
ATTORNEYS Patented Mar. 26, 1935

1,995,460

UNITED STATES PATENT OFFICE 1,995,460

AIRCRAFT ROTATIVE WING MOUNTING

Joseph S. Pecker, Philadelphia, Pa., assignor to Autogiro Company of America, Philadelphia, Pa., a corporation of Delaware Application October 7, 1931, Serial No. 567,343

18 Claims. (Cl. 244—19)

This invention relates to rotor mounting and particularly to the mounting of rotative wings or blades, in aircraft of the rotative sustaining wing type, and it is especially concerned with the provision of simple, inexpensive, effective and reliable means of adjustment and maintenance of the adjustment of the blades of air rotors, and more specifically of their incidence.

The invention, in general, involves certain improvements over the mounting and incidence adjustment mechanisms disclosed and claimed in the copending application of Harold F. Pitcairn, Serial No. 552,298, filed July 22, 1931, and the copending application of Agnew E. Larsen, Serial No. 559,824, filed August 28, 1931. The present invention contemplates the maintenance of the advantages of a threaded mounting or attachment of the rotor blades or wings (certain advantages of which are clearly brought out in the said Pitcairn application), the advantages of certain special locations of the incidence adjusting mechanism (such as is brought out in the said Larsen application), and the advantages of a fine, vernier-like adjustment (which is variously exemplified in both said applications), while additionally obtaining, and combining with the aforesaid advantages, certain further advantages including the obtaining of increased ruggedness and strength in the threaded mounting of the rotor blades, greater speed and celerity in the assembly of the rotor and in adjustment of incidence, increased reliability of the mechanism, ready enlargement in the range of incidence adjustment if desired, great simplicity in the determination or reading of the incidence adjustment on the several blades of the rotor, reduction in the number of parts required for the rotor mounting and incidence adjustment mechanism, reduction in the overall size and dimensions of certain of the parts, flexibility of adaptation of the incidence adjusting device to various positions with respect to the articulation pins on which the blades are pivotally mounted, and means of quick detachment of the blades from their hub.

More specifically, the present invention involves the provision of mounting means for the blades of the air rotor including a member such as a blade spar having longitudinally extending ribbing or slots which preferably form a gear-like member, and a cooperating worm mounted in a tubular or sleeve-like member for engagement with the rack or gear of the blade to obtain positive and reliable incidence adjustment; the invention further involving preferably the combination of such adjusting means with a ribbed arrangement such as a spiral threaded means or a bayonet interlock arrangement around said spar or other mounting member which cooperates both for the mounting, retention, and adjustment of the rotor blade. Still further, the invention contemplates the provision, in association with the mounting mechanism, and preferably in association with the incidence adjusting parts thereof, of direct reading indicator or scale means for determining at a glance the incidence adjustment of the several blades, and the variations thereof.

These, and other features and advantages of the invention, will be more apparent from the following detailed description, taken together with the accompanying drawings, in which drawings—

Figure 1 is a somewhat diagrammatic side elevational view of an aircraft of the rotative wing type, to which my invention is applied;

Figure 2 is an enlarged fragmentary illustration of the left-hand part of the sustaining rotor of Figure 1 with a portion of the left-hand blade or wing spar shown in elevation, and with parts of the rotor and blade mounting structure shown in section;

Figure 3 is a top plan of the structure of Figure 2;

Figure 4 is a section on the line 4—4 of Figure 2;

Figure 5 is a view similar to Figure 2, but illustrating the application of certain mounting and incidence adjusting mechanism of the invention in a different position with relation to the pivot articulations of the blades;

Figure 6 is a plan view of the structure shown in Figure 5;

Figure 7 is a section taken on the line 7—7 of Figure 5;

Figure 8 is a half section similar to Figure 7, illustrating a further modification in certain details of the device;

Figure 9 is a showing, half in vertical elevation and half in vertical longitudinal section, of a modified wing terminal construction, in which the wing spar itself is secured to its terminal fitting by means of a flared end and a split or spreader fitting, and in which the incidence adjustment device is of a simpler form, and the attachment of the terminal fitting in the forked socket for articulation of the blade, is by a multi-bayoneted or ribbed arrangement;

Figure 10 is a bottom plan view of the structure of Figure 9 with a direct reading incidence scale or indicator thereon, and with the blade spar omitted;

Figure 11 is an end elevation of the structure of Figure 10; and

Figure 12 is a fragmentary detail of a modification in the application of the scale mechanism of Figure 10.

By reference first to Figure 1, the field of application of the invention will be seen to involve air rotors, particularly sustaining bladed rotors applied to an aircraft indicated generally at 2. Such aircraft may include an empennage 3, landing gear 4, engine and propeller 5, 6, a primary sustaining system of rotative wings 7 which are preferably arranged for normal actuation under relative airflow, so as to be rotated on or about their common central axis 8 and pivotally swung or displaced on their horizontal and vertical articulations 9 and 10; supplemental fixed wing means 11, and cockpits 12 also being provided. Suitable mounting mechanism such as the pylon legs 13 may be provided for the rotor, and a starter or drive shaft 14 is also preferably provided.

In such an aircraft, as is now known in this art, it is necessary that the wing or blade mounting means provide not only for the common rotation of the rotor wings but also for displacements of the individual wings under the influence of varying flight forces, and to this end the pivots or articulations 9 and 10 are provided. In addition, it has been found desirable to provide means of varying the average effective incidence of the several blades, or their setting on the common hub or axis, and in this regard it will be noted that the line 7a indicates the trailing edge of one of the blades or wings, the position of which, as indicative of the plane of the wing chord, will be varied if the wing spar be turned about its longitudinal axis to different positions. Capability of variation in the setting of the blades is desirable, for example, to adjust them to any requisite positive incidence such as disclosed, for example, in the copending application of Juan de la Cierva, Serial No. 500,064, filed December 4, 1930, and further for the purpose of equalizing the operation of the several individual blades, or to compensate for variations in their manufacture, or for other reasons.

In addition to the foregoing, it is highly desirable that the incidence varying mechanism be as simple, compact, rugged and light in weight as possible, and that it cooperate with the other elements of the blade mounting so as to make a light weight structure as a whole, capable of withstanding the severe stresses of centrifugal, torsional and other forces in flight, without disturbance of the incidence adjustment and without interference with the free pivotal movement of the blades. Such an incidence adjusting mechanism is diagrammatically indicated at 15 in Figure 1.

The details of the present mechanism, in its preferred form, will be clear from an inspection of Figures 2, 3 and 4. By reference to said figures, it will be seen that the common rotative axis structure 8, actuated, as in starting, by driving and driven gears 16 and 17, is mounted for free rotation on suitable bearing means (not shown) and arranged for overrunning of the driving mechanism by a suitable overrunning device the casing of which is indicated at 18, the latter, however, forming no part of the present invention but being fully described and claimed in my copending application, Serial No. 512,383, filed January 30, 1931, and that suitable housing mechanism 19 and 20 is provided for the gearing and other parts. On said axis or said hub structure 8 there is provided, for each blade or wing, a pair of lugs or ears 21 in which the horizontal pin or articulation 9 is journalled, the vertical pin or articulation 10, in turn, being secured to the horizontal articulation by means of suitable bearing bushings 22 fitted in the extension block 23 which is made fast upon the pin 9 as by means of a key device 24.

The blade spar 25 is secured to the vertical articulation 10, preferably by being threaded into a socket member 26, as indicated at 27, said socket member having a forked or bifurcated end comprising two apertured lugs 28, in which the pin 10 is made fast. When at rest, the blades are prevented from swinging too high, as by gusts of wind, by the spring devices 29, and are restrained from swinging or drooping too far as by the droop supports 30 shown in Figure 1. Excessive lateral articulation of the blade, about its vertical pin 10, is prevented by means of the rubber cushions or blocks 31, which are mounted, in compression, between the brackets or sockets 32, 33. I do not herein claim the use of compression control means located at the vertical pivot, since the same forms part of the subject matter of the copending application of Agnew E. Larsen and Joseph S. Pecker, Serial No. 560,314 filed August 31, 1931, but the specific bracket arrangement and the method of mounting and securing the brackets forms a part of the present invention, and is particularly advantageous in connection with the mounting of the blade and the incidence adjustment mechanism.

From Figures 2 and 3 it will be clearly seen that for the bracket structure 32 a suitable strap device 34 is provided, which passes around the end of the socket member 26 between the fork members 28 thereof, such strap means and thus the bracket structure being slipped into place before assembly of the pivotal connection, and being secured by a suitable annular or split ring member 35 and tightening bolt device 36. Similarly, for the bracket structure 33 there is a strap 37 which passes about the end of the extension block 23, adjacent the strap member 34, and after the bracket structure 33 is slipped into place and the articulation completed, the latter bracket structure is secured by the split ring device 38 and bolt mechanism 39. The assembly of the articulated joint further retains the bracket device in place.

The adjustment of the blade incidence is effected by a device located outwardly of the threaded mounting of the blade in the socket member 26, said device, as clearly seen in Figure 4, including a squared housing 26a formed on the blade socket 26, in which a worm 40 is mounted for rotation, longitudinal movement of the worm being prevented by its head 41 and the nut 42 and pin 43. This worm engages with a series of generally longitudinal slots forming a gear or segment of a gear indicated at 44, on the periphery of the blade spar 25, which may be thickened at this point and turned to a good close fit in the socket. Thus torsional stresses on the blade are taken in tension by the worm. Opposite the worm housing 26a the socket 26 may be split as at 45, and formed with a pair of ears 46 which may be pulled together so as to tighten the whole structure in adjusted relation, as by means of the bolt and nut 47, 48.

The compactness of the mechanism, the ruggedness of its construction, the prevention of lost motion or "play", and the ease and simplicity of incidence adjustment, as well as of assembly of the whole mounting device for the blade will now be apparent.

By reference now to Figures 5, 6 and 7, it will be seen that the present incidence adjusting mechanism, as well as the blade movement controlling devices and other parts, are equally adapted to a construction in which the incidence adjustment device is located on the extension block, that is, between the horizontal and vertical pins. In this arrangement, the fork members 28a are joined to form an internal fitting for attachment to the blade spar 25a; the bracket devices 32a and 33a, with their straps 34a and 37a, are similarly mounted with respect to the fitting 26b and the vertical articulation pin 10a; but the connection between the horizontal and vertical pivots 9a and 10a is modified, so that in place of the extension block 23 of the structure of Figures 2, 3 and 4, I employ a pair of interfitting members 23a and 23b, the first of which is threaded into the second as at 23c. This threaded connection takes the place of the threaded connection 27b in Figure 2.

The worm 40a in this construction is mounted in the joint part 23b and reacts with the segmental gear 44a which is formed peripherally of the internal sleeve or joint part 23a. As before, a suitable worm housing 23c is provided, as well as a similar tightening bolt structure 47a, which is adapted to clamp the ears 46a. I may also internally bevel off the ends of the clamping structure as indicated at 45b, in order to prevent biting of the tubular member upon tightening the clamping mechanism. This tends to prevent disturbance of the incidence setting upon tightening the assembly. In order to shorten the overall length of the mounting structure, and to carry the blade spar, and thus the blade covering itself if desired, in close to the vertical pin, I may eliminate the split ring attachment for the bracket structure 32a, as by providing a solid backing 32b therefor, utilizing, as before, a split ring and bolt device 38a and 39a for the bracket structure 33a.

In the modified incidence adjusting device illustrated in Figure 8, which may be substituted for the structure shown in Figure 4 or for that shown in Figure 7, I utilize a socket member 26b which may be substituted either for the device 26 of Figure 4 or the device 23b of Figure 7, and which carries the usual worm adjustment device and housing therefor (not shown), but the clamping or tightening of this socket or annular member is quite different from the arrangements of Figures 4 and 7. In the first place, instead of being split (as at 45 or 45a, in the other constructions) the member 26b is a closed member, the two sides being integrally joined together by the tangentially arranged tubular or sleeve-like part 49. In the second place, the clamping action of the bolt and nut 50, 51 is not by direct action upon the member 26b but through the intermediation of a pair of wedge or cam elements 52, 52, which, when forced toward each other with their curved surfaces 53 bearing against the periphery of the spar or sleeve member 54, cause a gripping or binding action of a considerable portion of the area of the sleeve 26b upon the outer surface of the spar element 54. This construction appears to eliminate entirely any tendency of the tightening or binding device to produce a disturbance of the incidence adjustment as set by the worm and gear parts.

In the modification shown in Figures 9, 10 and 11, I retain the advantage of a rugged thread-like connection 55 between the socket portion 56 of the fork fitting 57 and the external sleeve fitting 58 of the main tubular spar 59 of the wing or blade; but instead of making such interlock connection in the form of a threaded ribbing, I here construct it as a bayonet ribbing made up of lugs 60 positioned exteriorly of the sleeve 58 and cooperating lugs 61 positioned interiorly of the socket 56. The lugs are in groups of three extending in a direction around the external periphery of the member 58 and around the internal periphery of the member 56, each lug being in length one-sixth of the peripheral length, the spacing between lugs 61 being indicated at 62 in Figure 11. Thus, by sliding the fork fitting 57 with its socket 56 over the end of the blade spar 59 with its sleeve 58, with the lugs 60 each positioned between a pair of lugs 61, and then causing a relative rotation of one-sixth of a turn, the lugs on the socket and blade spar sleeve are in interlocked position. A quickly mountable and demountable bayonet attachment is thereby provided between the wing and its fork mounting fitting.

Before considering the modified incidence adjustment mechanism utilized with this bayonet attachment, certain advantages of the mounting construction itself should be here pointed out. The fork fitting 57 is, of course, apertured as at 63 for reception of the usual vertically extending pivot pin 10, such as used in the previous constructions. The sleeve fitting 58 for the root end of the spar 59 is mounted externally of the spar and is split or recessed at the end to form a pair of extended wing-like elements or webs 64. After proper location of the sleeve 58 on the spar 59, as by means of a couple of rivets 65, the flanges or extensions 64 may be welded as at 66 to the spar. By thus mounting the blade spar inside the socket or sleeve member, greater strength is secured at the root end of the blade, and a multiplicity of rivet holes and consequent weakening of the spar is obviated. The inner end of the spar 59 is swaged or turned to form a hook-like engagement 67 with the inner end 68 of the sleeve 58, and a spreader fitting or plug 69 is preferably inserted in the inner end of the spar, in tight fitting and preferably wedge engagement therewith, and may further be welded thereto as at 70.

No special formation of the root end of the spar is necessary, a standard tubular spar member being employed, since the special configuration and contour required for the bayonet mounting and for the gear teeth 71 are provided on the separately made sleeve member 58; and although standard or stock tubing may be employed for the spar, yet the connection between the spar itself and the terminal sleeve fitting 58 is more than sufficiently firm to withstand all centrifugal action of the wing and any other forces encountered in flight. The extensions or flanges 64 of the sleeve fitting further produce added support adjacent the root end of the spar, and a graduated distribution of stresses such as occur in starting or stopping the rotor.

Considering now the incidence adjusting mechanism, it will be seen that the gear teeth 71 on the spar sleeve fitting 58 cooperate with the worm 72 which is mounted in the lug members 73, 74. The worm 72 is turned by means of its head 75 and held in proper position by means of the nut 76 and suitable securing cotter or wire 77.

In Figures 10 and 11 it will be seen that the lug or ear 74 carries a scale 78 on its periphery, which may be marked off to read in degrees or minutes, a suitable mark 79 being provided, if desired, on the head 75, whereby direct indication of incidence setting for each blade of the rotor may be readily obtained.

In Figure 12 I have indicated a modification of the arrangement of Figures 10 and 11, in which a fixed mark 79a is provided on the lugs 74a and in which the head 75a for the worm carries the scale indicated at 78a. The incidence setting shown both in Figure 10 and in Figure 12 is shown as being three degrees.

By any of the constructions disclosed in the present case, the incidence adjusting mechanism may readily be arranged to cover a considerable range of movement, so that a given rotor may be variously set for different characteristics, or operating conditions, and yet a fine or vernier-like adjustment of the blade is obtainable with relatively considerable turning of the worm, so that if only a very small variation, such as is needed to correct for manufacturing inaccuracies, be desired, this can be readily, quickly and accurately obtained. At the same time, the several devices are practically self-contained, and are more compact and shielded and protected than devices heretofore used. In any position of adjustment, the reaction between the worm and its gear, and the resulting reaction against the fixed or movable relatively rotatable parts, is the same, that is, the angularity of the force or reaction upon the various parts is not altered for different positions of adjustment, as would be the case in devices wherein a fixed adjusting screw acts upon a fixed extended lug means on the blade spar.

It will also now be readily observed that any of the forms of the incidence adjustment mechanism embodied in the present invention are equally adaptable to various locations, such as a location between the horizontal and vertical pivot pins of the blade, or a location outside of the vertical pivot pin; and further, that the relation of the incidence adjusting mechanism to the other parts of the blade mounting means and rubber bumpers and their mounting brackets is such that in any location of the adjusting means, or any position of adjustment, there is full freedom for proper blade articulative movement, for proper adjustment of the incidence of the blade and for proper action of the rubber damping blocks and their associated parts.

I claim:—

1. In a mounting for rotor blades, a blade spar, an attachment fitting for securing the blade to its rotational axis, and means for securing the end of the blade spar inside said fitting, said means including a flared end on said spar.

2. In a mounting for rotor blades, a blade spar, an attachment fitting for securing the blade to its rotational axis, and means for securing the end of the blade spar inside said fitting, said means including a flared end on said spar and a wedge-plug fitted into the spar end.

3. In a mounting for rotor blades, a blade spar, an attachment fitting for securing the blade to its rotational axis, and means for securing the end of the blade spar inside said fitting, said means including a flared end on said spar and a sleeve member interposed between the spar and the attachment fitting.

4. In rotor blade mounting mechanism, a socket member, a tubular member extending therein and being relatively rotatable, and a movable device mounted in the socket member and having toothed engagement with the tubular member for rotative adjustment of said members, said socket member being split at least at one side thereof adjacent a substantially diametrical plane taken through the socket adjacent said movable device.

5. In rotor blade mounting mechanism, a socket member, a tubular member extending therein and being relatively rotatable, and a movable device mounted in the socket member and having toothed engagement with the tubular member for rotative adjustment of said members, said socket member having tightening means at least at one side thereof adjacent a substantially diametrical plane taken through the socket adjacent said movable device.

6. In rotor blade mounting mechanism, a socket member, a tubular member extending therein and being relatively rotatable, and a movable device mounted in the socket member and having toothed engagement with the tubular member for rotative adjustment of said members, said socket member having wedge-like take-up means at a point substantially diametrically opposite said movable device.

7. In aircraft sustaining-wing incidence-adjusting mechanism, a pair of relatively rotatable connection elements, releasable means for gripping one upon the other, and a threaded adjusting device mounted in the gripping means and positioned to coact with one of said elements to rotate it.

8. In rotor blade mounting mechanism, means of blade incidence adjustment including parts arranged for relative turning, means for tightening the adjusted assembly, and means tending to prevent relative turning and thus disturbance of the adjustment upon actuation of the tightening means.

9. In a mounting for rotor blades, a blade spar, a blade articulation, and means for securing the spar to the articulation including a sleeve-like element telescoped with the spar and having its end split or recessed to form wing-like elements for engaging the spar.

10. In rotor blade mounting mechanism having a pair of blade articulations, an extension block between said articulations comprising an internal sleeve transversely apertured for an articulation, an external sleeve transversely apertured for the other articulation, and a threaded connection between the sleeves.

11. In rotor blade mounting mechanism having a pair of blade articulations, an extension block between said articulations comprising an internal sleeve transversely apertured for an articulation, an external sleeve transversely apertured for the other articulation, and a threaded connection between the sleeves, together with a turned portion on the internal sleeve arranged to center the sleeves.

12. In rotor blade mounting mechanism having a pair of blade articulations, an extension block between said articulations comprising an internal sleeve transversely apertured for an articulation, an external sleeve transversely apertured for the other articulation, and a threaded connection between the sleeves, together with a turned portion on the internal sleeve arranged to center the sleeves and having gear teeth cut thereon, and a worm mounted in the external sleeve engaging the teeth and arranged to take blade tortion under tension.

13. In rotor blade mounting mechanism, a fork-end member, a member fitted between the forks, an articulation pin joining said members, and a blade movement control device mounted on at least one of said members and retained in place by the articulation of the members.

14. In rotor blade mounting mechanism, a fork-end member, a member fitted between the forks, an articulation pin joining said members, and a blade movement control device mounted on at least one of said members and having a retaining ring extending around the body of said member.

15. In rotor blade mounting mechanism, a fork-end member, a member fitted between the forks, an articulation pin joining said members, and a blade movement control device mounted on at least one of said members and having a retaining strap extended across the end of said member.

16. An aircraft rotative wing mounting, comprising, in combination with an upright rotor hub or axis structure, a horizontal wing pivot axis, an extension block mounted thereon and extending generally radially of the upright axis, a main wing spar extending generally radially of said upright axis, means for mounting said spar on said extension block including a generally vertical wing pivot axis, a bracket mounted on the extension block, a bracket mounted on the wing spar, cushion means reacting between said brackets for controlling wing movements on said vertical pivot, and means acting to retain said brackets and cushion means in place when said vertical pivot is inserted.

17. An aircraft rotative wing mounting, comprising, in combination with an upright rotor hub or axis structure, a horizontal wing pivot axis, an extension block mounted thereon and extending generally radially of the upright axis, a main wing spar extending generally radially of said upright axis, means for mounting said spar on said extension block including a generally vertical wing pivot axis, a bracket mounted on the extension block, a bracket mounted on the wing spar, cushion means reacting between said brackets for controlling wing movements on said vertical pivot, means acting to retain said brackets and cushion means in place when said vertical pivot is inserted, and means for adjusting the incidence of the wing positioned at a point radially spaced from said cushion and bracket means.

18. In an aircraft, an upwardly extended axis mechanism, a sustaining blade mounted for rotation about the axis of said mechanism and pivotally joined to the axis mechanism at least on a substantially vertically extended pivot axis, and means for controlling blade movements about said pivot axis, said means including opposed bracket members mounted on pivot joint parts and a resilient bumper normally under compression between said bracket elements.

JOSEPH S. PECKER.